Patented Apr. 28, 1942

2,280,774

UNITED STATES PATENT OFFICE 2,280,774

DERIVATIVES OF α-CYANO-γ-ACETYL-GLUTARIC ACID AND PROCESS FOR THE MANUFACTURE THEREOF

Max Hoffer, Basel, Switzerland, assignor to Hoffmann-La Roche Inc., Nutley, N. J., a corporation of New Jersey No Drawing. Application February 18, 1941, Serial No. 379,546. In Switzerland March 29, 1940

17 Claims. (Cl. 260—464)

It is known that aldehydes combine with acetoacetic esters as well as with derivatives of cyanacetic acid to form condensation products (Berichte der Deutschen Chemischen Gesellschaft, vol. 29, year 1896, page 172; vol. 31, year 1898, page 730; Gazzetta Chimica Italiana, vol. 31, I, page 452).

It has now been found that derivatives of 2-cyano-4-acetyl-glutaric acid can be obtained by the simultaneous action of aldehydes or aldehyde-hydrates on acetoacetic esters and derivatives of cyanoacetic acid in presence of secondary amines as catalysts. As derivatives of cyanoacetic acid its esters and amides, as well as the nitrile, i. e., malondinitrile can be used. As aldehydes there may be used any aldehydes of the aliphatic, aromatic and cycloaliphatic series, for instance, aliphatic aldehydes, such as acetaldehyde, propionaldehyde, butyraldehyde, isobutyraldehyde, valeraldehyde and their isomers and homologues; also aromatic aldehydes, such as benzaldehyde and its homologues, α- and β-naphthaldehyde and their homologues and other aldehydes of condensed aromatic hydrocarbons. Moreover, aldehydes can be employed whose radical is composed of an aromatic and aliphatic portion, such as phenylacetaldehyde, cinnamic aldehyde and others; in addition aldehydes of the cycloaliphatic series, such as hexahydrobenzaldehyde, tetrahydrobenzaldehyde and their homologues and analogous compounds. Furthermore, aldehydes can be used which carry substituents at the hydrocarbon radical of the aldehyde, such as, for instance, halogens, free and protected hydroxy-groups, nitro-groups, esterified carboxyl-groups, protected amino-groups and many others. It is understood, however, that the aldehydes must not contain an atom-group or atom-groupings which can otherwise react chemically with the remaining reaction partners or with the catalyst. Of particular interest are the aldehydes corresponding to the general formula

R″OCH$_2$CHO wherein R″ also represents an aliphatic, aromatic or cycloaliphatic radical. R″ may represent, for instance, an aliphatic radical, such as methyl, ethyl, propyl, isopropyl, butyl and its isomers and homologues, allyl, crotyl and isomers and homologues, or an aromatic radical, such as phenyl, α- and β-naphthyl, and other radicals of condensed nucleus systems; but also radicals made up of an aliphatic and aromatic radicals, such as benzyl, phenylethyl, naphthylmethyl and homologues of these compounds may be used. Finally, R″ may represent an alicyclic radical, such as cyclohexyl, cyclopentyl or a homologue and analogue of these radicals. Of these aldehydes phenoxyacetaldehyde is particularly readily accessible and it will, therefore, be employed in the working of this invention if the nature of the radical R″ is unimportant.

As acetoacetic esters there may be used all esters with lower aliphatic alcohols, such as, for instance, the methyl-, ethyl-, propyl-, isopropyl-, alyl-, or butyl-ester and their homologues and isomers.

As catalyst all secondary amines are suitable whose dissociation constant in water at 20° C. is greater than about $10^{-6}$. To these must be counted secondary amines of the aliphatic series, such as diethylamine, dimethylamine and their homologues, furthermore diallylamine, dicrotylamine and their homologues; but also unsymmetrically substituted secondary amines, such as methylethylamine, methylallylamine and others. Moreover, the aliphatic radicals can form a ring with the nitrogen atom, such as, for instance, piperidine and its homologues; and also secondary amines with aromatic radicals can be employed, such as, for instance, methylbenzylamine and its homologues.

Since lower aliphatic amines, including heterocyclic amines, possess better solubilising properties and are more easily volatile, they will render the reaction product impure to a lesser degree, for which reason special interest appertains to their use.

The reaction occurs by condensation with elimination of 1 molecule of water. The reaction is illustrated by the following formula in the case of cyanacetamide, wherein the radical R represents the radical of the aldehyde. When other derivatives of cyanoacetic acid are used the cyanacetamide need accordingly only be replaced by such derivatives.

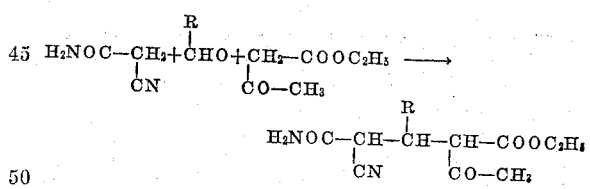

The condensation is preferably carried out in presence of an indifferent solvent, but its success is not dependent upon the type and the presence of the solvent. A solvent is suitably used in which the reaction partners are sufficiently soluble and from which the reaction product can easily be separated, for instance, by crystallisation.

It was to be anticipated that the simultaneous action of an aldehyde on acetoacetic esters and a derivative of cyanoacetic acid would produce a mixture of the condensation products of the aldehyde with acetoacetic ester and with the derivative of cyanoacetic acid. It is surprising that the three components do not give a mixture but a uniform condensation product, even if one of the non-aldehyde components is present in excess.

The new compounds are to be used as intermediates for the manufacture of medicinal preparations.

*Example 1*

106 parts by weight of benzaldehyde together with 84 parts by weight of cyanacetamide, 130 parts by weight of acetoacetic ester and 800 parts by volume of alcohol are heated to 55–60° C. until the cyanacetamide is dissolved. 2 parts by weight of piperidine are now added whereby the solution becomes darker and the temperature spontaneously rises to 70–75° C. The product is then kept at this temperature for 30 minutes and allowed to cool overnight. The resulting crystal mass is sucked off. α-Cyano-β-phenyl-γ-acetyl-glutaric acid monoethylester monoamide crystallises from methanol in long needles which effloresce on drying and melt at 126° C. The yield is 65 per cent of the theoretical.

*Example 2*

If, in Example 1, 66 parts by weight of malononitrile are used instead of cyanacetamide, α-cyano-β-phenyl-γ-acetyl-glutaric acid monoester mononitrile is obtained in an analogous manner and crystallises from alcohol in rather difficulty soluble, white prisms of melting point 186–187° C. corr. The yield amounts to 68 per cent of the theoretical.

*Example 3*

151 parts by weight of p-nitrobenzaldehyde, 84 parts by weight of cyanacetamide, 130 parts by weight of acetoacetic ester are heated with 250 parts by volume of alcohol nearly to the boiling point of the mixture. 2 parts by weight of piperidine are now added whereupon the mixture starts to boil owing to the heat of reaction. It is left to boil for 10 minutes, double the volume of water is added and the product allowed to cool to crystallisation. After standing for several hours, the resulting thick crystalline mass is sucked off and, if necessary, recrystallised from alcohol. α-Cyano-β-nitrophenyl-γ-acetyl-glutaric acid monoethylester monoamide crystallises in white prismatic needles, melting at 154° C. The yield is 80 per cent of the theoretical.

*Example 4*

72 parts by weight of isobutyraldehyde, 84 parts by weight of cyanacetamide, 130 parts by weight of acetoacetic ester are dissolved in 400 parts by volume of alcohol by warming. The product is allowed to cool to about 40° C. and then 2 parts by weight of piperidine added. After standing for 5 days some crystals separate which increase in quantity on addition of the same volume of water. α-Cyano-β-isopropyl-γ-acetyl-glutaric acid monoethylester monoamide is obtained in fine, white prisms of melting point 143° C. The yield is 27 per cent of the theoretical.

*Example 5*

72 parts by weight of isobutyraldehyde, 66 parts by weight of malonodinitrile and 130 parts by weight of acetoacetic ester yield α-cyano-β-isopropyl-γ-acetyl-glutaric acid monoethylester mononitrile in fine, white prisms on heating to about 70–80° C. for 30 minutes in presence of 2 parts by weight of piperidine. The product is sucked off and washed with methyl alcohol. The compound melts at 188–189° C. The yield is 25 per cent of the theoretical.

*Example 6*

155 parts by weight of phenoxyacetaldehyde hydrate, 84 parts by weight of cyanacetamide, 130 parts by weight of acetoacetic ester are reacted under the same conditions as in Example 3. α-Cyano-β-phenoxymethyl-γ-acetyl-glutaric acid monoethylester monoamide is obtained in a yield of 63 per cent of the theoretical. It crystallises from methanol in shiny plates of melting point 149° C.

*Example 7*

If, in Example 6, instead of cyanacetamide 66 parts by weight of malonodinitrile are used, α-cyano-β-phenoxy-methyl-γ-acetyl-glutaric acid monoester mononitrile is obtained in a yield of 60 per cent of the theoretical. It crystallises from alcohol in white prisms which, like the amide, also melt at 149° C.

*Example 8*

132 parts by weight of cinnamaldehyde, 84 parts by weight of cyanacetamide and 130 parts by weight of acetoacetic ester are heated with 200 parts by volume of alcohol and 2 parts by weight of piperidine for 1 hour on a steam bath under reflux. A light-yellow, homogeneous solution is obtained from which α-cyano-β-styryl-γ-acetyl-glutaric acid monoester monoamide, which crystallises very slowly, separates in the course of several days. The product is crystallised from glacial acetic acid. The compound is a white crystalline powder of melting point 197° C.

I claim:

1. A compound of the formula

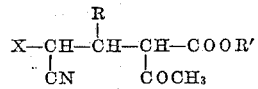

wherein R is selected from the group consisting of alkyl, alkoxyalkyl, cycloalkoxyalkyl, aryloxyalkyl, aralkyloxyalkyl, aryl, aralkyl and cycloalkyl radicals, and X from the group consisting of —CONH$_2$ and —CN, and R' is a lower alkyl radical.

2. A compound of the formula

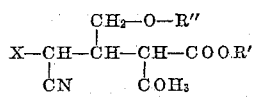

wherein X is selected from the group consisting of —CONH$_2$ and —CN, R' represents a lower alkyl and R'' is selected from the group consisting of alkyl, aryl, aralkyl and cycloalkyl radicals.

3. A compound of the formula

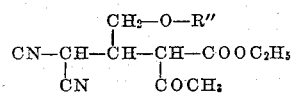

wherein R'' is selected from the group consisting of alkyl, aryl, aralkyl and cycloalkyl radicals.

4. α-Cyano-β-phenoxymethyl-γ-acetyl-glutaric acid monoethylester mononitrile.

5. α-Cyano-β-phenoxymethyl-γ-acetyl-glutaric acid monoethylester monoamide.

6. α-Cyano-β-phenoxymethyl-γ-acetyl-glutaric acid monomethylester mononitrile.

7. Process for the manufacture of a compound of the formula $$X-CH-\underset{\underset{CN}{|}}{CH}-\underset{\underset{COCH_3}{|}}{CH}-COOR'$$

wherein R is selected from the group consisting of alkyl, alkoxyalkyl, cycloalkoxyalkyl, aryloxyalkyl, aralkyloxyalkyl, aryl, aralkyl and cycloalkyl radicals, and X from the group consisting of —CONH$_2$ and —CN, and R' is a lower alkyl radical, comprising condensing an aldehyde of the formula $$R-CHO$$

with an ester of acetoacetic acid of the formula $$CH_3CO-CH_2-COOR'$$

and a derivative of cyanoacetic acid of the formula $$X-CH_2-CN$$

in the presence of a secondary amine having a dissociation constant greater than $10^{-6}$.

8. Process for the manufacture of a compound of the formula $$X-\underset{\underset{CN}{|}}{CH}-\underset{\underset{}{|}}{\overset{\overset{CH_2-O-R''}{|}}{CH}}-\underset{\underset{COCH_3}{|}}{CH}-COOR'$$

wherein X is selected from the group consisting of —CONH$_2$ and —CN, R' represents a lower alkyl and R'' is selected from the group consisting of alkyl, aryl, aralkyl and cycloalkyl radicals, comprising condensing an aldehyde of the formula $$R''-O-CH_2-CHO$$

with an acetoacetic ester of the formula $$CH_3CO-CH-COOR'$$

and a derivative of cyanacetic acid of the formula $$X-CH_2-CN$$

in the presence of a secondary amine having a dissociation constant greater than $10^{-6}$.

9. Process for the manufacture of a compound of the formula $$CN-\underset{\underset{CN}{|}}{CH}-\underset{\underset{}{|}}{\overset{\overset{CH_2-O-R''}{|}}{CH}}-\underset{\underset{COCH_3}{|}}{CH}-COOC_2H_5$$

wherein R'' is selected from the group consisting of alkyl, aryl, aralkyl and cycloalkyl radicals, comprising condensing an aldehyde of the formula $$R''-O-CH_2-CHO$$

with ethylacetoacetate and cyanacetic acid nitrile in the presence of a secondary amine having a dissociation constant greater than $10^{-6}$.

10. Process for the manufacture of a compound of the formula $$CN-\underset{\underset{CN}{|}}{CH}-\underset{\underset{}{|}}{\overset{\overset{CH_2-O-R''}{|}}{CH}}-\underset{\underset{COCH_3}{|}}{CH}-COOC_2H_5$$

wherein R'' is selected from the group consisting of alkyl, aryl, aralkyl and cycloalkyl radicals, comprising condensing an aldehyde of the formula $$R''-O-CH_2-CHO$$

with ethylacetoacetate and cyanacetic acid nitrile in the presence of a secondary amine having a dissociation constant greater than $10^{-6}$, selected from the group consisting of lower aliphatic and heterocyclic secondary amines.

11. Process for the manufacture of a compound of the formula $$CN-\underset{\underset{CN}{|}}{CH}-\underset{\underset{}{|}}{\overset{\overset{CH_2-O-R''}{|}}{CH}}-\underset{\underset{COCH_3}{|}}{CH}-COOC_2H_5$$

wherein R'' is selected from the group consisting of alkyl, aryl, aralkyl and cycloalkyl radicals, comprising condensing an aldehyde of the formula $$R''-O-CH_2-CHO$$

with ethylacetoacetate and cyanacetic acid nitrile in the presence of a secondary amine selected from the group consisting of piperidine and diethylamine.

12. Process for the manufacture of α-cyano-β-phenoxymethyl-γ-acetyl-glutaric acid monoethylester mononitrile, comprising condensing phenoxy-acetaldehyde with ethylacetoacetate and cyanacetic acid nitrile in the presence of a secondary amine having a dissociation constant greater than $10^{-6}$, selected from the group consisting of lower aliphatic and heterocyclic secondary amines.

13. Process for the manufacture of α-cyano-β-phenoxymethyl-γ-acetyl-glutaric acid monoethylester mononitrile, comprising condensing phenoxy-acetaldehyde with ethylacetoacetate and cyanacetic acid nitrile in the presence of a secondary amine selected from the group consisting of piperidine and diethylamine.

14. Process for the manufacture of α-cyano-β-phenoxymethyl-γ-acetyl-glutaric acid monoethylester monoamide, comprising condensing phenoxy-acetaldehyde with ethylacetoacetate and cyanacetamide in the presence of a secondary amine having a dissociation constant greater than $10^{-6}$, selected from the group consisting of lower aliphatic and heterocyclic secondary amines.

15. Process for the manufacture of α-cyano-β-phenoxymethyl-γ-acetyl-glutaric acid monoethylester monoamide, comprising condensing phenoxy-acetaldehyde with ethylacetoacetate and cyanacetamide in the presence of a secondary amine selected from the group consisting of piperidine and diethylamine.

16. Process for the manufacture of α-cyano-β-phenoxymethyl-γ-acetyl-glutaric acid monomethylester mononitrile, comprising condensing phenoxy-acetaldehyde with methylacetoacetate and cyanacetic acid nitrile in the presence of a secondary amine having a dissociation constant greater than $10^{-6}$, selected from the group consisting of lower aliphatic and heterocyclic secondary amines.

17. Process for the manufacture of α-cyano-β-phenoxymethyl-γ-acetyl-glutaric acid monomethylester mononitrile, comprising condensing phenoxy-acetaldehyde with methylacetoacetate and cyanacetic acid nitrile in the presence of a secondary amine selected from the group consisting of piperidine and diethylamine.

MAX HOFFER.